United States Patent
Lee et al.

(10) Patent No.: US 11,764,373 B2
(45) Date of Patent: Sep. 19, 2023

(54) STACK VENTILATION SYSTEM

(71) Applicants: Hyundai Motor Company, Seoul (KR); Kia Motors Corporation, Seoul (KR)

(72) Inventors: Byeong Seung Lee, Seoul (KR); Kyoung Ku Ha, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/208,451

(22) Filed: Mar. 22, 2021

(65) Prior Publication Data

US 2022/0190362 A1 Jun. 16, 2022

(30) Foreign Application Priority Data

Dec. 15, 2020 (KR) .................. 10-2020-0175476

(51) Int. Cl.
*H01M 8/04* (2016.01)
*H01M 8/04089* (2016.01)
*H01M 8/04746* (2016.01)
*H01M 8/2465* (2016.01)

(52) U.S. Cl.
CPC ... *H01M 8/04104* (2013.01); *H01M 8/04761* (2013.01); *H01M 8/2465* (2013.01)

(58) Field of Classification Search
CPC ......... H01M 8/04104; H01M 8/04761; H01M 8/2465
See application file for complete search history.

(56) References Cited

U.S. PATENT DOCUMENTS

| | | | |
|---|---|---|---|
| 9,947,945 B2 | 4/2018 | Cusumano et al. | |
| 2009/0017745 A1 | 1/2009 | Kum et al. | |
| 2009/0087708 A1 | 4/2009 | Yamashita et al. | |
| 2015/0349361 A1* | 12/2015 | Kwon | H01M 8/04201 429/450 |
| 2016/0133971 A1* | 5/2016 | Naganuma | H01M 8/04768 429/434 |
| 2018/0339603 A1* | 11/2018 | Shim | B60L 58/30 |
| 2018/0342746 A1* | 11/2018 | Lee | B60L 58/31 |
| 2019/0109331 A1 | 4/2019 | Skala | |
| 2019/0260048 A1* | 8/2019 | Tomi | H01M 8/04432 |

FOREIGN PATENT DOCUMENTS

| | | |
|---|---|---|
| JP | 2004-186029 A | 7/2004 |
| KR | 2009-0007013 A | 1/2009 |
| KR | 101755907 B1 | 7/2017 |
| WO | 2007/129602 A1 | 11/2007 |

* cited by examiner

*Primary Examiner* — Olatunji A Godo
(74) *Attorney, Agent, or Firm* — Fox Rothschild LLP

(57) ABSTRACT

A stack ventilation system includes a supply line that supplies a supply gas to an air electrode of a fuel cell stack, a discharge line that discharges an exhaust gas released from the air electrode, and a stack supply line that branches off from a branching point of the supply line and that supplies the supply gas in the supply line to a stack enclosure in which the fuel cell stack is accommodated.

10 Claims, 3 Drawing Sheets

STACK VENTILATION SYSTEM

CROSS-REFERENCE TO RELATED APPLICATION

This application claims under 35 U.S.C. § 119(a) the benefit of Korean Patent Application No. 10-2020-0175476, filed in the Korean Intellectual Property Office on Dec. 15, 2020, the entire contents of which are incorporated herein by reference.

BACKGROUND

(a) Technical Field

The present disclosure relates to a stack ventilation system.

(b) Description of the Related Art

A fuel cell system produces electricity by supplying fuel gas containing hydrogen to a fuel electrode of a fuel cell stack and air to an air electrode of the fuel cell stack and causing an electrochemical reaction of the fuel gas with oxygen in the air through an electrolyte membrane.

The fuel cell stack is usually accommodated in a stack enclosure, and a stack ventilation process of ventilating an inside of the stack enclosure to discharge moisture generated due to dew condensation is required for the stack enclosure. Accordingly, a ventilation line connected to the stack enclosure is separately provided.

However, the fuel cell system in the related art performs the stack ventilation process using negative pressure of an intake side when a compressor is driven, and therefore there is a risk of deteriorating the efficiency of the compressor. Furthermore, the stack ventilation process may be performed only when the compressor is driven.

In addition, in the case of the fuel cell system in the related art, water may flow into the ventilation line when a vehicle is flooded.

SUMMARY

An aspect of the present disclosure provides a stack ventilation system for improving efficiency of a compressor, enabling stack ventilation irrespective of whether the compressor is driven, and improving a waterproofing effect.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a stack ventilation system includes a supply line that supplies a supply gas to an air electrode of a fuel cell stack, a discharge line that discharges an exhaust gas released from the air electrode, and a stack supply line that branches off from a branching point of the supply line and that supplies the supply gas in the supply line to a stack enclosure in which the fuel cell stack is accommodated. For example, the branching point may be one point of the supply line.

According to an embodiment, the stack ventilation system may further include a first filter that is disposed in line-with the supply line and that filters foreign matter, and the branching point may be located downstream of the first filter along the supply line.

According to an embodiment, the stack ventilation system may further include a flow sensor that is disposed in-line with the supply line and that measures a flow rate of the supply gas, and the branching point may be located upstream of the flow sensor along the supply line.

According to an embodiment, the stack ventilation system may further include a compressor that is disposed in-line with the supply line and that compresses the supply gas and releases the compressed supply gas, and the branching point may be located upstream of the compressor along the supply line.

According to an embodiment, an inlet formed in the stack enclosure to allow the supply gas in the stack supply line to flow into the stack enclosure may be located at a top of the stack enclosure.

According to an embodiment, the stack ventilation system may further include a blower that is disposed in-line with the stack supply line and that forcibly moves the supply gas in the stack supply line toward the stack enclosure.

According to an embodiment, the stack ventilation system may further include a pressure adjustment device that is disposed in-line with the discharge line and that adjusts pressure of the exhaust gas and a stack discharge line that connects the stack enclosure and one point of the discharge line located downstream of the pressure adjustment device and that discharges the supply gas introduced into the stack enclosure to the discharge line.

According to an embodiment, the stack ventilation system may further include a second filter that is disposed in-line with the stack discharge line and that prevents introduction of foreign matter into the stack enclosure through the stack discharge line.

According to an embodiment, an outlet formed in the stack enclosure to release the supply gas in the stack enclosure to the stack discharge line may be located at a top of the stack enclosure.

According to an embodiment, the stack ventilation system may further include a blower that is disposed in-line with the stack discharge line and that forcibly moves the supply gas in the stack discharge line toward the discharge line.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
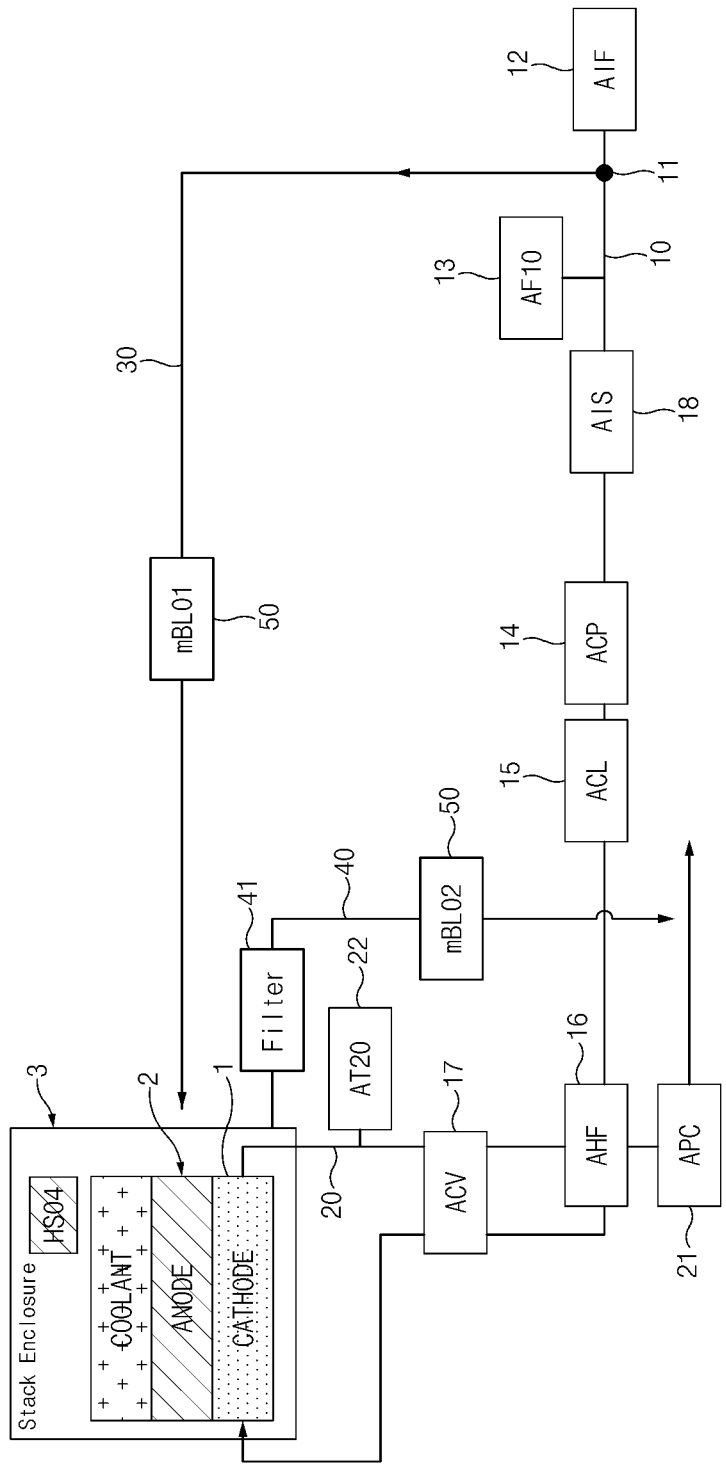
FIG. 1 is a view illustrating a stack ventilation system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

A stack ventilation system according to an embodiment of the present disclosure relates is configured to ventilate a stack enclosure 3 of a fuel cell system. The stack ventilation system may include a supply line 10, a discharge line 20, and a stack supply line 30. The supply line 10 may be configured to supply a supply gas to an air electrode 1 of a fuel cell stack 2. The discharge line 20 may be configured to discharge an exhaust gas released from the air electrode 1. The stack supply line 30 may branch off from a branching point 11 of the supply line 10, where the branching point 11 may be one point of the supply line 10. The stack supply line 30 may be configured to supply the supply gas in the supply line 10 to the stack enclosure 3 in which the fuel cell stack 2 is accommodated.

According to the present disclosure, stack ventilation may be performed through the stack supply line 30 branching off from the supply line 10 that supplies air to the air electrode 1. Accordingly, the stack ventilation may be performed irrespective of whether a compressor 14 is driven.

Furthermore, because the stack ventilation is performed irrespective of whether the compressor 14 is driven, the efficiency of the compressor 14 may be improved, as compared with when stack ventilation is performed by forming negative pressure through the compressor 14.

<First Filter 12>

The stack ventilation system according to the embodiment of the present disclosure may further include a first filter 12. The first filter 12 may be disposed in-line with the supply line 10 and may be configured to filter foreign matter introduced into the supply line 10. The branching point 11 may be located downstream of the first filter 12 along the supply line 10. The term "downstream" as used herein may be based on a flow of the supply gas. When the branching point 11 is located downstream of the first filter 12, it may mean that the branching point 11 is located to the left of the first filter 12 with respect to FIG. 1. Because the branching point 11 is formed downstream of the first filter 12, a separate filter does not have to be disposed in-line with the stack supply line 30. Accordingly, manufacturing costs may be reduced.

<Flow Sensor 13>

The stack ventilation system according to the embodiment of the present disclosure may further include a flow sensor 13. The flow sensor 13 may be disposed in-line with the supply line 10 and may be configured to measure the flow rate of the supply gas. The branching point 11 may be located upstream of the flow sensor 13 along the supply line 10. When the branching point 11 is located upstream of the flow sensor 13, it may mean that the branching point 11 is located to the right of the flow sensor 13 with respect to FIG. 1. For example, the branching point 11 may be a point between the first filter 12 and the flow sensor 13. Because the branching point 11 is located upstream of the flow sensor 13, the flow sensor 13 may measure only the flow rate of the flow gas in the supply line 10. Accordingly, the flow rate of the supply gas to be introduced into the air electrode 1 may be accurately measured.

<Compressor 14>

The stack ventilation system according to the embodiment of the present disclosure may further include a compressor 14. The compressor 14 may be disposed in-line with the supply line 10 and may be configured to compress the supply gas and release the compressed supply gas. The branching point 11 may be located upstream of the compressor 14 along the supply line 10. When the branching point 11 is located upstream of the compressor 14, it may mean that the branching point 11 is located to the right of the compressor 14 with respect to FIG. 1. For example, the branching point 11 may be a point between the first filter 12 and the compressor 14.

For example, a case in which the branching point 11 is located downstream of the compressor 14 may be considered. In this case, part of the supply gas compressed and released by the compressor 14 may flow into the stack supply line 30. That is, part of the supply gas compressed so as to be introduced into the air electrode 1 may flow into the stack supply line 30, and therefore the pressure of the supply gas introduced into the air electrode 1 may be lowered.

In the stack ventilation system according to the embodiment of the present disclosure, the branching point 11 may be formed upstream of the compressor 14, and a separate blower 50, which will be described below, may be disposed in-line with the stack supply line 30. Accordingly, the supply gas compressed by the compressor 14 may be introduced into the air electrode 1 without flowing into the stack supply line 30, and thus the pressure of the supply gas introduced into the air electrode 1 may be maintained.

<Pressure Adjustment Device 21 and Stack Discharge Line 40>

The stack ventilation system according to the embodiment of the present disclosure may further include a pressure adjustment device 21 and a stack discharge line 40. The pressure adjustment device 21 may be disposed in-line with the discharge line 20 and may be configured to adjust the pressure of the exhaust gas. The stack discharge line 40 may be configured to discharge the supply gas introduced into the stack enclosure 3 to the discharge line 20. The stack discharge line 40 may be configured to connect the stack enclosure 3 and one point of the discharge line 20 that is located downstream of the pressure adjustment device 21. When the one point is located downstream of the pressure adjustment device 21, it may mean that the one point is located to the right of the pressure adjustment device 21 with respect to FIG. 1.

For example, a case in which the stack discharge line 40 is connected with the discharge line 20 at a point located upstream of the pressure adjustment device 21 may be considered. In this case, the exhaust gas may flow back into the stack discharge line 40 when the pressure of the exhaust gas in the discharge line 20 is higher than the pressure of the supply gas in the stack discharge line 40.

However, in the stack ventilation system according to the embodiment of the present disclosure, the stack discharge line 40 may be connected with the discharge line 20 at the one point located downstream of the pressure adjustment device 21. Accordingly, the pressure adjustment device 21 may adjust the pressure of the exhaust gas in the discharge line 20 and may prevent the exhaust gas from flowing back into the stack discharge line 40.

<Second Filter 41>

The stack ventilation system according to the embodiment of the present disclosure may further include a second filter 41. The second filter 41 may be disposed in-line with the stack discharge line 40 and may prevent foreign matter from being introduced into the stack enclosure 3 through the stack discharge line 40 when a reverse flow occurs in the stack discharge line 40.

<Blower 50>

The stack ventilation system according to the embodiment of the present disclosure may further include a blower 50. The blower 50 may be disposed in-line with the stack supply line 30 and may forcibly move the supply gas in the stack supply line 30 toward the stack enclosure 3.

Alternatively, the blower 50 may be disposed in-line with the stack discharge line 40 and may forcibly move the supply gas in the stack discharge line 40 toward the discharge line 20. For example, the blower 50 may be disposed in-line with at least one of the stack supply line 30 or the stack discharge line 40. FIG. 1 illustrates an example that the blowers 50 are disposed in-line with the stack supply line 30 and the stack discharge line 40, respectively.

Inlet 4 and Outlet 5>

Figure 2:
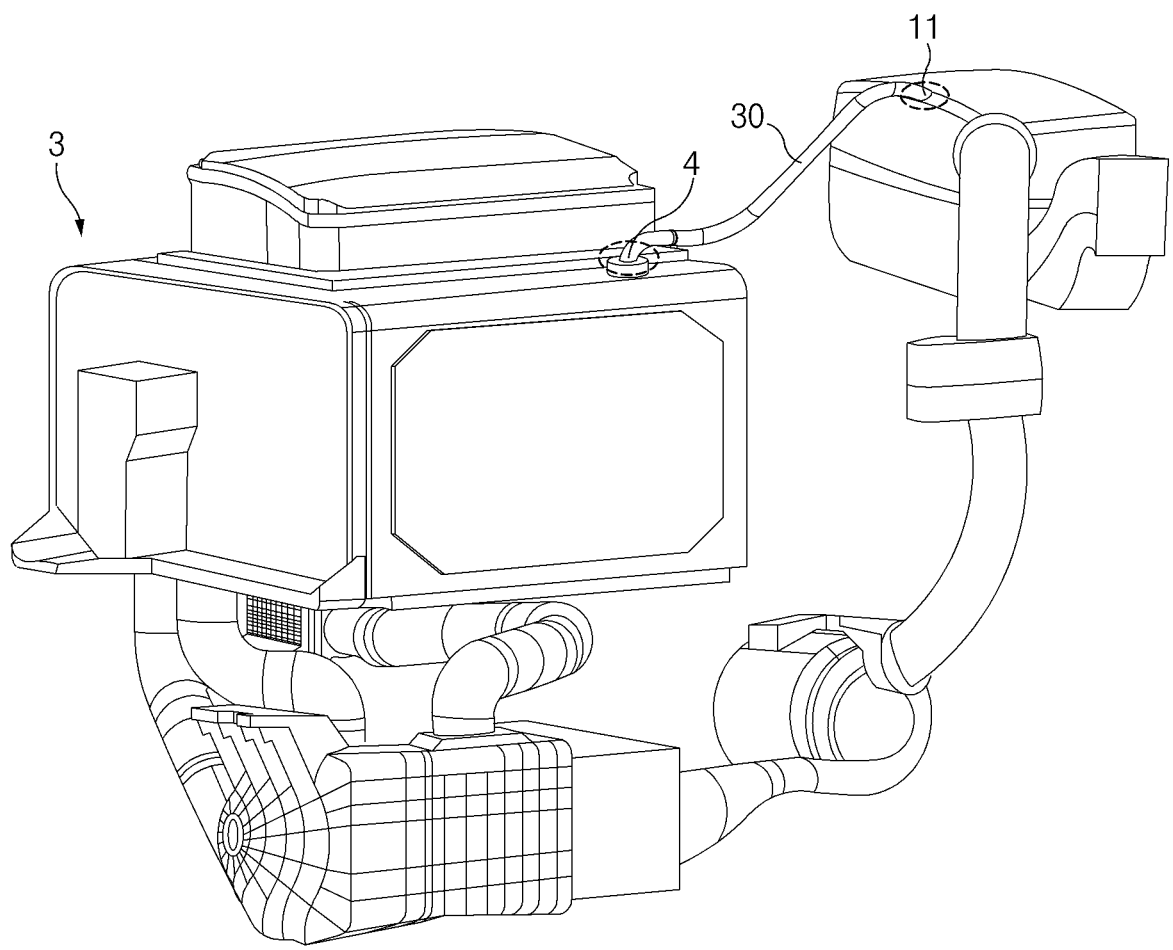
FIG. 2 is a view illustrating a portion where an inlet is formed in a stack enclosure of the stack ventilation system according to the embodiment of the present disclosure.

An inlet 4 may be formed in the stack enclosure 3. FIG. 2 is a view illustrating a portion where the inlet is formed in the stack enclosure of the stack ventilation system according to the embodiment of the present disclosure. The inlet 4 may be located at a top of the stack enclosure 3. The inlet 4 may be formed in the stack enclosure 3 to allow the supply gas in the stack supply line 30 to flow into the stack enclosure 3. The inlet 4 may be located at the top of the stack enclosure 3. Because the inlet 4 is located at the top of the stack enclosure 3, a risk that water flows into the stack enclosure 3 through the inlet 4 may be reduced even when a vehicle is flooded. Accordingly, a waterproofing effect may be improved.

Figure 3:
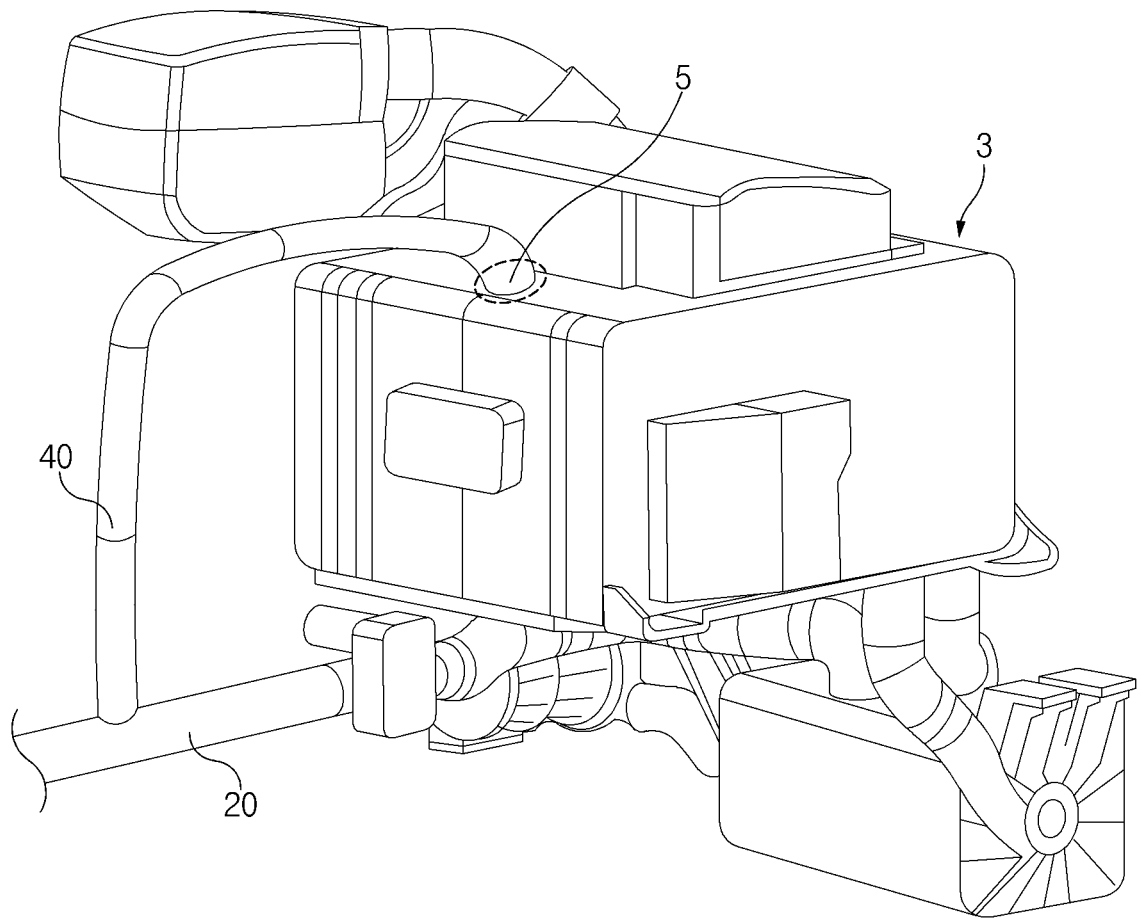
FIG. 3 is a view illustrating a portion where an outlet is formed in the stack enclosure of the stack ventilation system according to the embodiment of the present disclosure.

In addition, an outlet 5 may be formed in the stack enclosure 3. FIG. 3 is a view illustrating a portion where the outlet is formed in the stack enclosure of the stack ventilation system according to the embodiment of the present disclosure. The outlet 5 may be formed in the stack enclosure 3 to release the supply gas in the stack enclosure 3 to the stack discharge line 40. The outlet 5 may be located at the top of the stack enclosure 3. Because the outlet 5 is located at the top of the stack enclosure 3, a risk that water flows into the stack enclosure 3 through the outlet 5 may be reduced even when the vehicle is flooded. Accordingly, a waterproofing effect may be improved.

The stack ventilation system according to the embodiment of the present disclosure may further include an air cooler 15, a humidifier 16, and an air blast circuit breaker 17 that are disposed in-line with the supply line 10. The branching point 11 may be located upstream of at least one of the air cooler 15, the humidifier 16, or the air blast circuit breaker 17. In general, the air cooler 15, the humidifier 16, and the air blast circuit breaker 17 may be disposed downstream of the compressor 14. Accordingly, because the branching point 11 is located upstream of the compressor 14, the branching point 11 may be located upstream of at least one of the air cooler 15, the humidifier 16, or the air blast circuit breaker 17. As the branching point 11 is located upstream of the humidifier 16, humidified air may be prevented from being introduced into the stack enclosure 3.

The stack ventilation system according to the embodiment of the present disclosure may further include a silencer 18 disposed in-line with the supply line 10. The silencer 18 may be disposed upstream of the compressor 14.

The stack ventilation system according to the embodiment of the present disclosure may further include a temperature sensor 22 disposed in-line with the discharge line 20. The temperature sensor 22 may be disposed upstream of the pressure adjustment device 21. The temperature sensor 22 may be configured to obtain information about the temperature of a portion of the discharge line 20 that is located upstream of the pressure adjustment device 21.

As described above, according to the present disclosure, the stack ventilation may be performed through the stack supply line branching off from the supply line that supplies air to the air electrode. Accordingly, the stack ventilation may be performed irrespective of whether the compressor is driven, and thus the efficiency of the compressor may be improved.

In addition, according to the present disclosure, the inlet for the stack supply line and the outlet for the stack discharge line may be located at the top of the stack enclosure. Accordingly, a risk that water flows into the stack enclosure may be reduced even when the vehicle is flooded, and thus a waterproofing effect may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A stack ventilation system, comprising:
   a supply line configured to supply air to an air electrode of a fuel cell stack, wherein one end of the supply line is directly connected to the fuel cell stack;
   a discharge line configured to discharge an exhaust gas released from the air electrode, wherein one end of the discharge line is connected to the fuel cell stack; and
   a stack supply line branching off from a branching point of the supply line at a first end, the stack supply line configured to supply the air in the supply line to a stack enclosure in which the fuel cell stack is accommodated, wherein a second end of the stack supply line is connected to the stack enclosure.

2. The stack ventilation system of claim 1, further comprising:
   a first filter disposed in-line with the supply line and configured to filter foreign matter,
   wherein the branching point is located downstream of the first filter along the supply line.

3. The stack ventilation system of claim 1, further comprising:
   a flow sensor disposed in-line with the supply line and configured to measure a flow rate of the air;
   wherein the branching point is located upstream of the flow sensor along the supply line.

4. The stack ventilation system of claim 1, further comprising:
   a compressor disposed in-line with the supply line and configured to compress the air and release the compressed air,
   wherein the branching point is located upstream of the compressor along the supply line.

5. The stack ventilation system of claim 1, wherein an inlet formed in the stack enclosure to allow the air in the stack supply line to flow into the stack enclosure is located at a top of the stack enclosure.

6. The stack ventilation system of claim 1, further comprising:
   a blower disposed in-line with the stack supply line and configured to forcibly move the air in the stack supply line toward the stack enclosure.

7. The stack ventilation system of claim 1, further comprising:
   a pressure adjustment device disposed in-line with the discharge line and configured to adjust pressure of the exhaust gas; and
   a stack discharge line configured to connect the stack enclosure and one point of the discharge line that is located downstream of the pressure adjustment device, the stack discharge line being configured to discharge the air introduced into the stack enclosure to the discharge line.

8. The stack ventilation system of claim 7, further comprising:
   a second filter disposed in-line with the stack discharge line and configured to prevent introduction of foreign matter into the stack enclosure through the stack discharge line.

9. The stack ventilation system of claim 7, wherein an outlet formed in the stack enclosure to release the air in the stack enclosure to the stack discharge line is located at a top of the stack enclosure.

10. The stack ventilation system of claim 7, further comprising:
   a blower disposed in-line with the stack discharge line and configured to forcibly move the air in the stack discharge line toward the discharge line.

* * * * *